(12) United States Patent
Sakuyama et al.

(10) Patent No.: US 7,593,578 B2
(45) Date of Patent: Sep. 22, 2009

(54) CODING AND DECODING OF IMAGE DATA WITH ADDITIONAL INFORMATION

(75) Inventors: Hiroyuki Sakuyama, Tokyo (JP); Junichi Hara, Kanagawa (JP); Akio Matsubara, Kanagawa (JP); Nekka Matsuura, Kanagawa (JP); Toshio Miyazawa, Kanagawa (JP); Yasuyuki Nomizu, Kanagawa (JP); Yasuyuki Shinkai, Kanagawa (JP); Takanori Yano, Kanagawa (JP); Taku Kodama, Kanagawa (JP); Takayuki Nishimura, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 829 days.

(21) Appl. No.: 10/717,674

(22) Filed: Nov. 21, 2003

(65) Prior Publication Data
US 2004/0151387 A1    Aug. 5, 2004

(30) Foreign Application Priority Data
Nov. 22, 2002   (JP) ............................. 2002-338774

(51) Int. Cl.
*G06K 9/30* (2006.01)
*H04N 7/12* (2006.01)

(52) U.S. Cl. ................... 382/232; 382/233; 375/240.01

(58) Field of Classification Search ................ 382/100, 382/232, 233, 240, 243; 358/1.16, 1.9; 386/68; 375/240, 240.01, 240.12
See application file for complete search history.

(56) References Cited

U.S. PATENT DOCUMENTS

| | | | |
|---|---|---|---|
| 5,687,256 A | 11/1997 | Kimura et al. | 382/232 |
| 6,041,143 A * | 3/2000 | Chui et al. | 382/232 |
| 6,160,844 A * | 12/2000 | Wilkinson | 375/240 |
| 6,246,438 B1 * | 6/2001 | Nishikawa et al. | 375/240.01 |
| 6,553,150 B1 * | 4/2003 | Wee et al. | 382/243 |
| 6,571,071 B2 | 5/2003 | Kanoshima et al. | 399/79 |
| 6,674,982 B2 | 1/2004 | Saitoh et al. | 399/110 |
| 6,980,732 B1 * | 12/2005 | Suzuki | 386/68 |
| 2001/0050778 A1 | 12/2001 | Fukuda et al. | 358/1.9 |
| 2002/0057843 A1 | 5/2002 | Matsubara | 382/240 |
| 2002/0159644 A1 | 10/2002 | Sakuyama | 382/240 |
| 2003/0002583 A1 * | 1/2003 | Geerlings | 375/240.12 |

(Continued)

FOREIGN PATENT DOCUMENTS

JP    6-245082    9/1994

(Continued)

OTHER PUBLICATIONS

U.S. Appl. No. 10/986,781, filed Nov. 15, 2004, Matsuura et al.

(Continued)

*Primary Examiner*—Duy M Dang
(74) *Attorney, Agent, or Firm*—Oblon, Spivak, McClelland, Maier & Neustadt, L.L.P.

(57) ABSTRACT

An apparatus for coding and decoding includes a decoding unit which decodes compressed and coded data to restore original image data, a storing unit which stores additional information other than the image data in memory, and a coding unit which encodes at least a portion of the additional information stored in said memory as information additional to the image data when performing second-time encoding of the image data decoded by said decoding unit.

12 Claims, 13 Drawing Sheets

U.S. PATENT DOCUMENTS

| | | | |
|---|---|---|---|
| 2003/0095272 A1 | 5/2003 | Nomizu | 358/1.9 |
| 2003/0137695 A1 | 7/2003 | Nomizu | 358/1.16 |
| 2003/0169935 A1 | 9/2003 | Sano et al. | 382/240 |

FOREIGN PATENT DOCUMENTS

| | | |
|---|---|---|
| JP | 8-317114 | 11/1996 |
| JP | 8-317115 | 11/1996 |
| JP | 2002-218148 | 8/2002 |

OTHER PUBLICATIONS

U.S. Appl. No. 10/390,193, filed Mar. 14, 2003, Sakuyama.
U.S. Appl. No. 10/317,911, filed Dec. 11, 2002, Sano et al.
U.S. Appl. No. 10/390,263, filed Mar. 14, 2003, Kodama.
U.S. Appl. No. 10/372,479, filed Feb. 21, 2003, Nomizu.
U.S. Appl. No. 10/348,444, filed Jan. 21, 2003, Nomizu.
U.S. Appl. No. 10/283,350, filed Oct. 30, 2002, Nomizu.
U.S. Appl. No. 10/082,308, filed Feb. 26, 2002, Sakuyama.
U.S. Appl. No. 09/985,784, filed Nov. 6, 2001, Matsubara.
U.S. Appl. No. 09/847,192, filed May 2, 2001, Fukuda et al.
U.S. Appl. No. 09/770,214, filed Jan. 29, 2001, Oteki et al.
U.S. Appl. No. 09/772,945, filed Jan. 31, 2001, Oteki et al.
U.S. Appl. No. 09/846,244, filed May 2, 2001, Shoji et al.
U.S. Appl. No. 09/855,665, filed May 16, 2001, Yamagata et al.
U.S. Appl. No. 09/912,364, filed Jul. 26, 2001, Sakuyama.
U.S. Appl. No. 09/940,589, filed Aug. 29, 2001, Inoue et al.
U.S. Appl. No. 09/964,584, filed Sep. 28, 2001, Shinkai et al.
U.S. Appl. No. 10/102,633, filed Mar. 22, 2002, Ameyama et al.
U.S. Appl. No. 10/156,093, filed May 29, 2002, Sano et al.
U.S. Appl. No. 10/164,545, filed Jun. 10, 2002, Sano et al.
U.S. Appl. No. 10/247,497, filed Sep. 20, 2002, Sano et al.
U.S. Appl. No. 10/272,857, filed Oct. 18, 2002, Watanabe et al.
U.S. Appl. No. 10/379,533, filed Mar. 6, 2003, Takeyama et al.
U.S. Appl. No. 12/047,839, filed Mar. 13, 2008, Kodama.

* cited by examiner

FIG.7

| Marker code range | Standard definition |
|---|---|
| 0xFF00, 0xFF01, 0xFFFE, 0xFFC0—0xFFDF | Defined in ITU-T Rec. T.81 \| ISO/IEC 10918-1 |
| 0xFFF0—0xFFF6 | Defined in ITU-T Rec. T.84 \| ISO/IEC 10918-3 |
| 0xFFF7—0xFFF8 | Defined in ITU-T Rec. T.87 \| ISO/IEC 14495-1 |
| 0xFF4F—0xFF6F, 0xFF90—0xFF93 | Defined in this Recommendation \| International Standard |
| 0xFF30—0xFF3F | Reserved for definition as markers only (no marker segments) |
| | All other values reserved |

CODING AND DECODING OF IMAGE DATA WITH ADDITIONAL INFORMATION

BACKGROUND OF THE INVENTION

1. Field of the Invention

The present invention generally relates to coding and decoding apparatuses and record media having programs recorded therein, and particularly relates to a coding and decoding apparatus and a record medium having a program stored therein for coding and decoding data together with additional information.

2. Description of the Related Art

It is believed that a demand for improved performance and multifunctionality will increase with respect to the image compression/decompression technology, which improves the manipulability of high-definition still images. As an image compression/decompression algorithm that improves the manipulability of high-definition still images, JPEG (Joint Photographic Experts Group) is most widely used at present. JPEG2000, which was to be chosen as an international standard in 2001, offers an algorithm that provides higher performance than JPEG. Also, improvements in multiple functionality, flexibility and expandability for various applications are made. Because of this, JPEG2000 is now expected to be a successor of JPEG as a next-generation compression/decompression format for high-definition still images.

In personal computers which process code data compressed and encoded by such image compression/decompression technology, various viewers are installed as applications that are provided with a decoding function to decode the coded data. These viewers make it possible to obtain original image data for displaying or printing.

In recent years, the trend has been to use viewers that are provided with an encoding function in addition to the decoding function, thereby utilizing the lossless coding/decoding ability of JPEG2000. This makes it possible to encode image data a second time after it has been decoded. For example, a document image may be scanned in a horizontal position by a scanner connected to a personal computer for compression and encoding of the image. Even if the image needs to be changed to a vertical position, editing such as rotation of an image cannot be done with respect to the coded data. The coded data in the horizontal position after compression and encoding is decoded to generate original image data (perfect restoration is possible through lossless conversion), and, then, editing such as rotation is performed. The image data edited into a vertical position is then encoded a second time by the encoding function. The same applies in the case of black and white reversing.

The code format of JPEG or JPEG2000 provides a comment marker, which can be used when adding information such as comments. At the time of compression and encoding, any additional information other than image data may be conveyed in the comment marker. The decoder detects the presence of such additional information at the time of decoding. If the name of an encoder used is indicated, the contents of the additional information may be displayed at the time of decoding, or may be presented as an image property after the decoding. Such additional information can be anything, but may include, for example, the date and time of scanning, the date and time of photographing, photographing conditions, copyright information, etc. The displaying and printing of contents of such a comment marker are disclosed in Patent Documents 1 and 2.

[Patent Document 1] Japanese Patent Application Publication No. 8-137114

[Patent Document 2] Japanese Patent Application Publication No. 8-137115

FIG. 15 is a flowchart showing a related-art process of decoding and second-time encoding. As shown in the flowchart, coded data that has been compressed according to the JPEG format together with comment data are provided (step S101). Installed application (viewer) decodes the coded data, and displays the decoded image data while storing the image data and the comment data separately (step S102). If an instruction for second-time encoding is given by a user (Y at S103), only the stored image data is compressed by the encoder for second-time encoding (S104).

In the related-art as described above, additional information such as a comment is discarded when encoding takes place a second time after decoding. This is because additional information is not regarded as being important as it is not necessary for the decoding of image data. Further, all that is required in display systems is to display decoded data, so that second-time encoding is not required in the first place. For example, when coded data is decoded, an image file is generally created. At the time of second-time encoding, this image file is encoded. The format of an image file only contains the header information of the image file. If a decoded image file is provided as bitmap data, a comment (additional information) cannot be utilized for second-time encoding since the bitmap file does not contain the comment.

Unfortunately, additional information may include significant information such as copyright information. The fact that the additional information is discarded at the time of second-time encoding presents an inconvenient situation for users. As previously described, JPEG2000 achieves lossless coding. Following the decoding of lossless coded data, additional information does not need modification in most cases, yet is discarded at the time of second-time lossless coding after editing such as rotating. This presents an inconvenient situation. Furthermore, a means to enter additional information may be a manual-based interface. It is thus cumbersome and inconvenient to enter the same or similar additional information again and again for individual images.

Accordingly, there is a need for a scheme that obviates user inconvenience by improving the usage of additional information at the time of second-time encoding after decoding coded data that has been compressed and encoded.

SUMMARY OF THE INVENTION

It is a general object of the present invention to provide a coding and decoding apparatus that substantially obviates one or more problems caused by the limitations and disadvantages of the related art.

It is another and more specific object of the invention to provide a coding and decoding apparatus that obviates user inconvenience by improving the usage of additional information at the time of second-time encoding after decoding coded data that has been compressed and encoded.

In order to achieve these objects according to the invention, an apparatus for coding and decoding includes a decoding unit which decodes compressed and coded data to restore original image data, a storing unit which stores additional information other than the image data in memory, and a coding unit which encodes at least a portion of the additional information stored in the memory as information additional to the image data when performing second-time encoding of the image data decoded by the decoding unit.

In the apparatus described above, the additional information other than the image data is stored in memory, and at least a portion of the stored additional information is encoded as information additional to the image data when performing second-time encoding of the decoded image data. This improves user convenience regarding the handling of the additional information.

According to another aspect of the invention, the apparatus further includes an additional information extracting unit which extracts the additional information from the compressed and coded data when the compressed and coded data is decoded, and the storing unit stores the additional information extracted by the additional information extracting unit in the memory.

In the apparatus described above, second-time encoding is performed, with the additional information left intact as it was included in the original code data, when performing second-time encoding of the decoded image data.

According to another aspect of the invention, the additional information stored by the storing unit is different from additional information included in the compressed and coded data.

In the apparatus described above, second-time encoding is performed, with the additional information being attached that is different from additional information included in the original code data, when performing second-time encoding of the decoded image data.

According to another aspect of the invention, the additional information stored by the storing unit is a default setting.

In the apparatus described above, additional information of a routine form such as "copyright xx" may be provided as a default setting, and such default additional information is included as the decoded image data is encoded a second time. This simplifies the process required for entering the additional information.

According to another aspect of the invention, the additional information stored by the storing unit is additional information extracted from another compressed and coded data different than the compressed and coded data.

In the apparatus described above, additional information extracted from another code data having common additional information may be provided in a storage, and such additional information of another code data is utilized as additional information for the code data of interest as the decoded image data is encoded a second time. This simplifies the process required for entering the additional information.

According to another aspect of the invention, the apparatus further includes an additional information adding unit which provides new additional information to be encoded in addition to the additional information stored by the storing unit.

In the apparatus described above, new additional information unique to the data to be encoded a second time may be added as mew additional information for second-time encoding if the stored additional information is not sufficient. This further improves user convenience.

According to another aspect of the invention, the apparatus further includes a selection unit which selects whether to encode the additional information when the coding unit performs the second-time encoding.

Depending on the content of additional information, the content of additional information may change significantly due to the editing that is performed after decoding. There may thus be a case in which the storing of such additional information is not necessary at the time of second-time encoding. Providing a choice as to whether to include the additional information for second-time encoding makes it possible to cope with user intension.

According to another aspect of the invention, the decoding unit and the coding unit comply with a JPEG format, and the additional information stored by the storing unit is information included in a COM marker of the JPEG format.

Accordingly, various comment information included in the COM marker can be used at the time of second-time encoding.

According to another aspect of the invention, the decoding unit and the coding unit comply with a JPEG2000 format, and the additional information stored by the storing unit is information included in a COM marker of the JPEG2000 format.

Accordingly, various comment information included in the COM marker can be used at the time of second-time encoding.

According to another aspect of the invention, the decoding unit and the coding unit comply with a JPEG2000 format, and the additional information stored by the storing unit is information that falls within a defined marker range of the JPEG2000 format, and that is not decipherable by the decoding unit.

Information may be a local code that is part of tags according to the JPEG2000 format but not defined in the standards, and is thus indecipherable by the decoding unit. Such information may be discarded, but there may be a decoding unit that can identify the information. Leaving such information intact at the time of second-time encoding as a safeguard may provide for such information to be effectively used later.

According to another aspect of the invention, the decoding unit and the coding unit comply with a JPEG2000 format, and the additional information stored by the storing unit is information included in a CRG marker of the JPEG2000 format.

Accordingly, information included in the CRG marker, which represents the arrangement of each component in the JPEG2000 format, can also be used at the time of second-time encoding.

According to another aspect of the invention, the decoding unit and the coding unit comply with a JPEG format, and the additional information stored by the storing unit is information included in a file format.

Accordingly, not only information included in the code format but also information included in the file format can also be used as additional information at the time of second-time encoding.

According to another aspect of the invention, the decoding unit and the coding unit comply with a JPEG2000 format, and the additional information stored by the storing unit is information included in a JP2 file format.

Accordingly, not only information included in the code format but also information included in the file format can also be used as additional information at the time of second-time encoding.

According to another aspect of the invention, the additional information is information included in an IPR box of the JP2 file format.

Accordingly, information about intellectual property such as "copyright xx" included in the IPR box of the JP2 file format may also be used as additional information at the time of second-time encoding.

According to another aspect of the invention, the additional information is information included in an XML box of the JP2 file format.

Accordingly, user-defined information in the XML format included in the XML box of the JP2 file format may also be used as additional information at the time of second-time encoding.

According to another aspect of the invention, the additional information is information included in a UUID box of the JP2 file format.

Accordingly, user-defined information identifier included in the UUID box of the JP2 file format may also be used as additional information at the time of second-time encoding.

According to another aspect of the invention, the additional information is information included in a UUID info box of the JP2 file format.

Accordingly, user-defined information included in the UUID info box of the JP2 file format may also be used as additional information at the time of second-time encoding.

According to another aspect of the invention, a computer-readable record medium having a program embodied therein for causing a computer to perform coding and decoding is provided, and the program includes a decoding unit which decodes compressed and coded data to restore original image data, a storing unit which stores additional information other than the image data in memory, and a coding unit which encodes at least a portion of the additional information stored in the memory as information additional to the image data when performing second-time encoding of the image data decoded by the decoding unit.

In the invention described above, the additional information other than the image data is stored in memory, and at least a portion of the stored additional information is encoded as information additional to the image data when performing second-time encoding of the decoded image data. This improves user convenience regarding the handling of the additional information.

According to another aspect of the invention, the program further comprises an additional information extracting unit which extracts the additional information from the compressed and coded data when the compressed and coded data is decoded, and the storing unit stores the additional information extracted by the additional information extracting unit in the memory.

In the invention described above, second-time encoding is performed, with the additional information left intact as it was included in the original code data, when performing second-time encoding of the decoded image data.

According to another aspect of the invention, the additional information stored by the storing unit is different from additional information included in the compressed and coded data.

In the invention described above, second-time encoding is performed, with the additional information being attached that is different from additional information included in the original code data, when performing second-time encoding of the decoded image data.

According to another aspect of the invention, the additional information stored by the storing unit is a default setting.

In the invention described above, additional information of a routine form such as "copyright xx" may be provided as a default setting, and such default additional information is included as the decoded image data is encoded a second time. This simplifies the process required for entering the additional information.

According to another aspect of the invention, the additional information stored by the storing unit is additional information extracted from another compressed and coded data different than the compressed and coded data.

In the invention described above, additional information extracted from another code data having common additional information may be provided in a storage, and such additional information of another code data is utilized as additional information for the code data of interest as the decoded image data is encoded a second time. This simplifies the process required for entering the additional information.

According to another aspect of the invention, the program further comprises an additional information adding unit which provides new additional information to be encoded in addition to the additional information stored by the storing unit.

In the invention described above, new additional information unique to the data to be encoded a second time may be added as mew additional information for second-time encoding if the stored additional information is not sufficient. This further improves user convenience.

According to another aspect of the invention, the program further comprises a selection unit which selects whether to encode the additional information when the coding unit performs the second-time encoding.

Depending on the content of additional information, the content of additional information may change significantly due to the editing that is performed after decoding. There may thus be a case in which the storing of such additional information is not necessary at the time of second-time encoding. Providing a choice as to whether to include the additional information for second-time encoding makes it possible to cope with user intension.

According to another aspect of the invention, the decoding unit and the coding unit comply with a JPEG format, and the additional information stored by the storing unit is information included in a COM marker of the JPEG format.

Accordingly, various comment information included in the COM marker can be used at the time of second-time encoding.

According to another aspect of the invention, the decoding unit and the coding unit comply with a JPEG2000 format, and the additional information stored by the storing unit is information included in a COM marker of the JPEG2000 format.

Accordingly, various comment information included in the COM marker can be used at the time of second-time encoding.

According to another aspect of the invention, the decoding unit and the coding unit comply with a JPEG2000 format, and the additional information stored by the storing unit is information that falls within a defined marker range of the JPEG2000 format, and that is not decipherable by the decoding unit.

Information may be a local code that is part of tags according to the JPEG2000 format but not defined in the standards, and is thus indecipherable by the decoding unit. Such information may be discarded, but there may be a decoding unit that can identify the information. Leaving such information intact at the time of second-time encoding as a safeguard may provide for such information to be effectively used later.

According to another aspect of the invention, the decoding unit and the coding unit comply with a JPEG2000 format, and the additional information stored by the storing unit is information included in a CRG marker of the JPEG2000 format.

Accordingly, information included in the CRG marker, which represents the arrangement of each component in the JPEG2000 format, can also be used at the time of second-time encoding.

According to another aspect of the invention, the decoding unit and the coding unit comply with a JPEG format, and the additional information stored by the storing unit is information included in a file format.

Accordingly, not only information included in the code format but also information included in the file format can also be used as additional information at the time of second-time encoding.

According to another aspect of the invention, the decoding unit and the coding unit comply with a JPEG2000 format, and the additional information stored by the storing unit is information included in a JP2 file format.

Accordingly, not only information included in the code format but also information included in the file format can also be used as additional information at the time of second-time encoding.

According to another aspect of the invention, the additional information is information included in an IPR box of the JP2 file format.

Accordingly, information about intellectual property such as "copyright xx" included in the IPR box of the JP2 file format may also be used as additional information at the time of second-time encoding.

According to another aspect of the invention, the additional information is information included in an XML box of the JP2 file format.

Accordingly, user-defined information in the XML format included in the XML box of the JP2 file format may also be used as additional information at the time of second-time encoding.

According to another aspect of the invention, the additional information is information included in a UUID box of the JP2 file format.

Accordingly, user-defined information identifier included in the UUID box of the JP2 file format may also be used as additional information at the time of second-time encoding.

According to another aspect of the invention, the additional information is information included in a UUID info box of the JP2 file format.

Accordingly, user-defined information included in the UUID info box of the JP2 file format may also be used as additional information at the time of second-time encoding.

Other objects and further features of the present invention will be apparent from the following detailed description when read in conjunction with the accompanying drawings.

BRIEF DESCRIPTION OF THE DRAWINGS

FIG. 7 is a drawing showing a code range of markers defined by JPEG2000;

DESCRIPTION OF THE PREFERRED EMBODIMENTS

In the following, embodiments of the present invention will be described with reference to the accompanying drawings.

Outline of JPEG2000

A coding and encoding according to an embodiment of the invention utilizes the JPEG2000 format. The outline of JPEG2000 will be described first.

Figure 1:
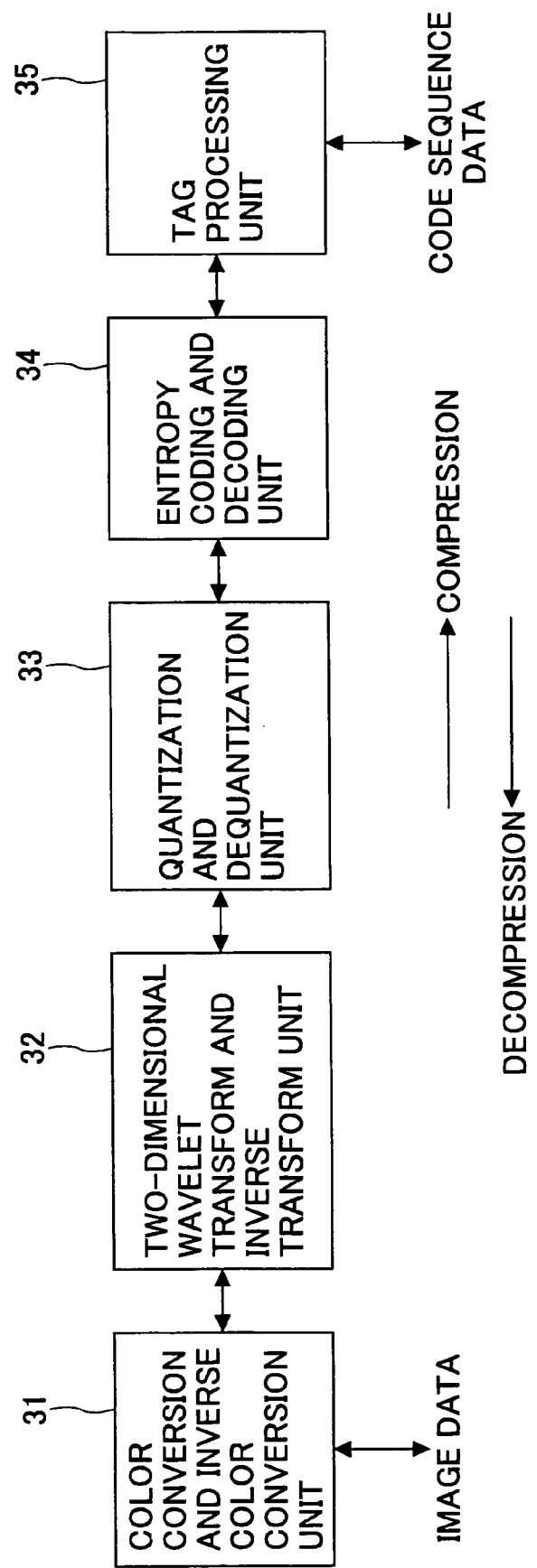
FIG. 1 is a block diagram showing a basic construction that performs compression and decompression according to the JPEG2000 algorithm.

FIG. 1 is a block diagram showing a basic construction that performs compression and decompression (decoding) according to the JPEG2000 algorithm. When a color image comprised of three components RGB is to be compressed, for example, a color conversion and inverse color conversion unit 31 converts these color components into luminance and chrominance components. A two-dimensional wavelet transform and inverse transform unit 32 then carries out the wavelet transform. As a need arises, a quantization and dequantization unit 33 performs quantization, and an entropy coding and decoding unit 34 performs entropy coding on a bitplane-by-bitplane basis. (To be exact, a bitplane is divided into three sub-bitplanes for coding). A tag processing unit 35 attends to required tag processing.

At the time of decompressing of coded data, the entropy coding and decoding unit 34 attends to entropy decoding on a bitplane-by-bitplane basis. Then, the quantization and dequantization unit 33 performs dequantization to obtain wavelet coefficients for each component. The two-dimensional wavelet transform and inverse transform unit 32 performs the inverse wavelet transform with respect to these wavelet coefficients. Following this, the color conversion and inverse color conversion unit 31 carries out inverse color conversion to provide RGB pixel data.

In JPEG2000, a quantization unit and an entropy coding unit are generally combined together to form an entropy coding and decoding unit 34. There may be various design modifications, which may includes a configuration having coding after quantization and a configuration having quantization after coding by disposal of some codes (or a configuration that encodes only required bitplanes). In the case of quantization by linear quantization, well-known liner quantization is performed with respect to wavelet coefficients, and bitplanes comprised of quantized coefficients after quantization are subjected to entropy coding. In the absence of linear quantization, on the other hand, unneeded bitplane codes are discarded. Alternatively, coding is performed only with respect to needed bitplanes (truncation). It should be noted that linear quantization cannot be applied in the case of the 5×3 wavelet transform. Truncation is instead used for quantization.

In JPEG2000 as described above, the color conversion unit and the wavelet transform unit are implemented as reversible (lossless) units. In the absence of quantization, reversible (lossless) compression and decompression are achieved as a whole.

Code Format of JPEG2000

Figure 2:
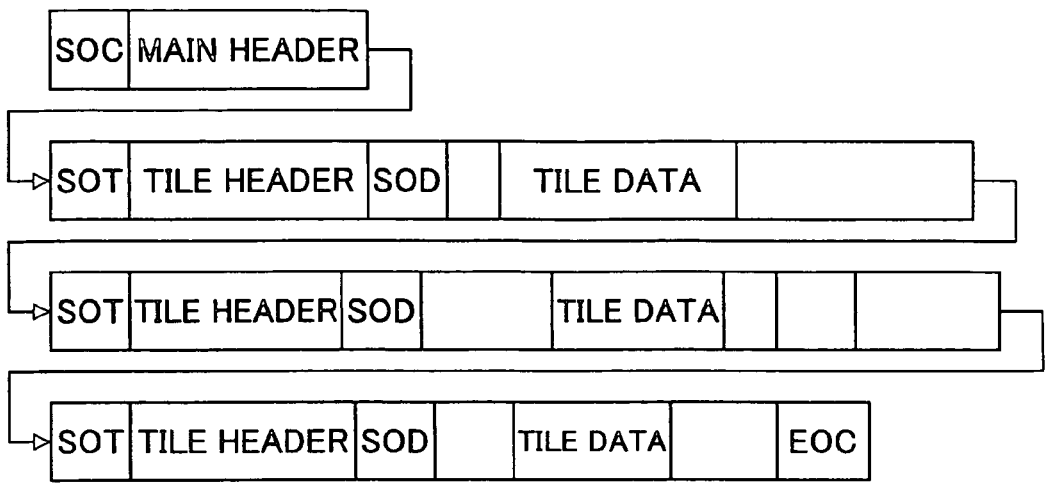
FIG. 2 is an illustrative drawing showing the code format of JPEG2000.

In the following, a description will be given of an example of the code format of JPEG2000. FIG. 2 is an illustrative drawing showing the code format of JPEG2000. The code format starts with an SOC (start of codestream) marker, which indicates the beginning of code data, followed by a main header, which describes coding parameters and quantization parameters. Actual code data follows them. The actual code data starts with an SOT (start of tile-part) marker, and is comprised of a tile header, an SOD (start of data) marker, and tile data (codes). After the code data corresponding to the entire image, an EOC (end of codestream) marker is added as an indication of an end of codes.

Figure 3:
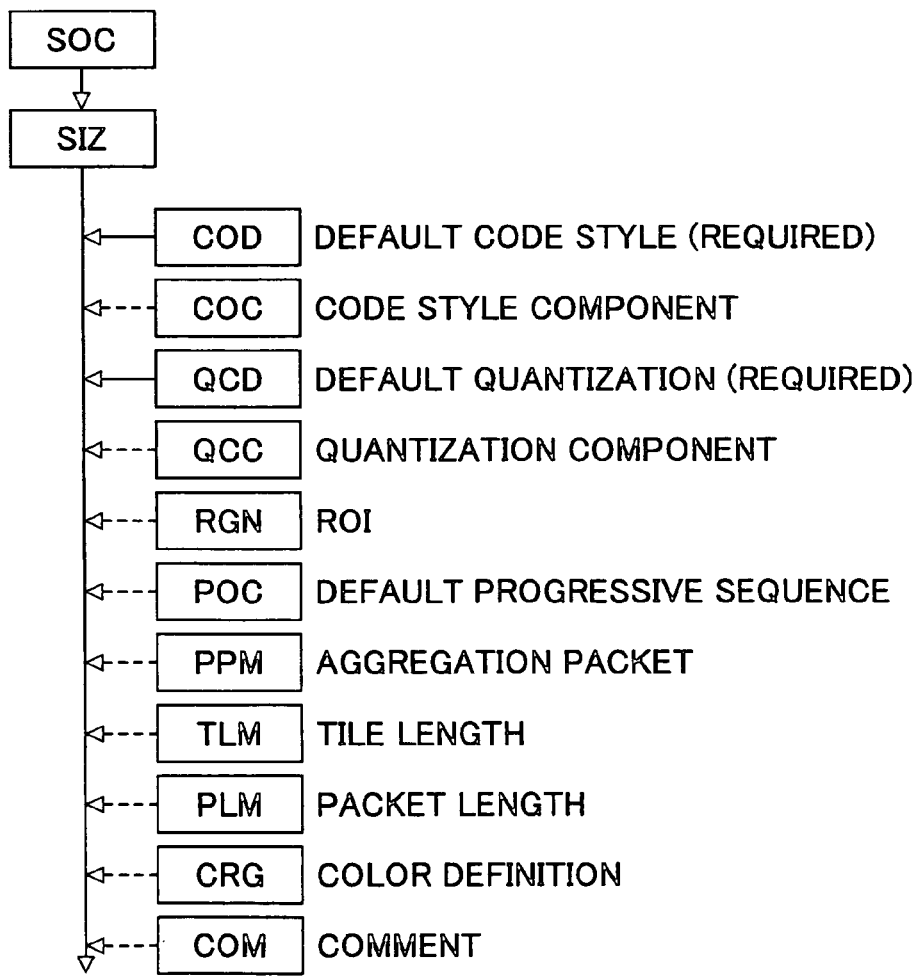
FIG. 3 is an illustrative drawing showing an example of a main header construction.

FIG. 3 is an illustrative drawing showing an example of a main header construction. The main header includes essential marker segments COD and QCD and optional marker segments COC, QCC, RGN, POC, PPM, TLM, PLM, CRG, and COM.

Figure 4A:
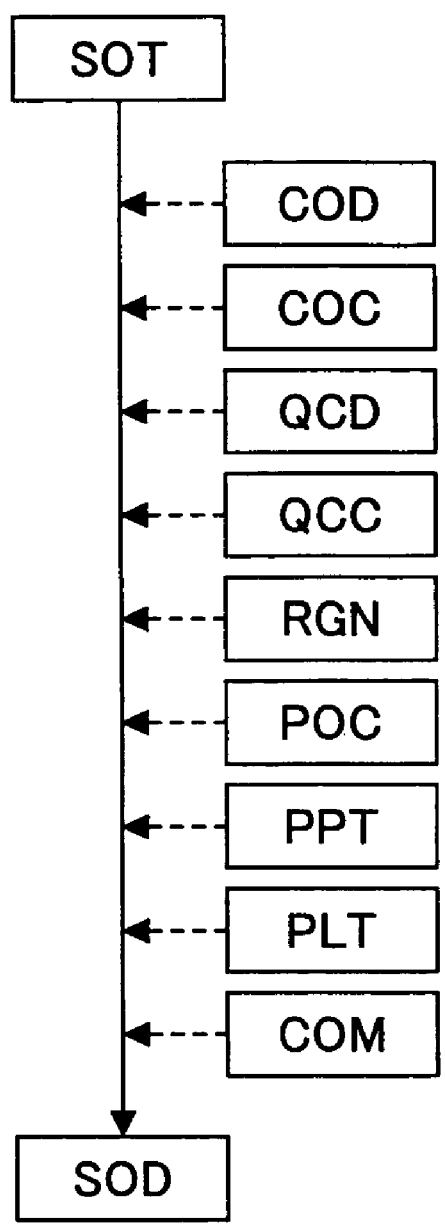
FIGS. 4A and 4B are illustrative drawings showing examples of a tile header.
Figure 4B:
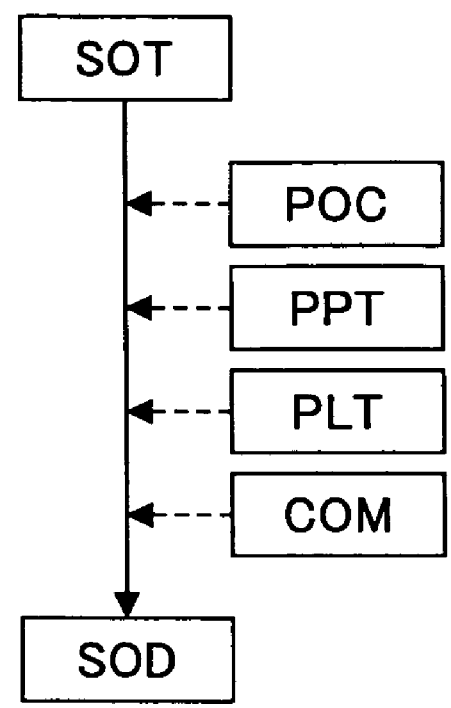

FIGS. 4A and 4B are illustrative drawings showing examples of the tile header. FIG. 4A shows a marker segment sequence that is added to the beginning of a tile header. Here, the marker segments COD, COC, QCD, QCC, RGN, POC, PPT, PLT, and COM (all optional) can be used. FIG. 4B shows a marker segment sequence that is added to the beginning of a divided partial tile sequence when the tile is divided into a plurality of portions. Here, the marker segments POC, PPT, PLT, and COM (all optional) can be used.

In what follows, a marker and a marker segment for use in JPEG2000 will be described. A marker consists of 2 bytes (the first byte is 0xff and the next byte is 0x01-0xfe). The marker and the marker segment may be classified into six categories as shown in the following:

(1) frame delimiter (delimiting);
(2) information about image position and size (fixed information);
(3) information about coding function (functional);
(4) error tolerance (in bit stream);
(5) bit-stream pointer (pointer); and
(6) auxiliary information (informational).

Among these, a marker relevant to the invention is the auxiliary information (informational). Details will be described below. The auxiliary information is a maker segment that is used for the purpose of inserting additional information into code data. It is acceptable to ignore this marker segment on the decoder side.

Figure 5:
FIG. 5 is an illustrative drawing showing an example of the construction of a CGR marker segment.

A description will first be given of a spatial component arrangement (CRG marker). This marker segment describes positional relationships between components when sampling intervals specified by XRsiz and YRsiz in an SIZ marker segment differ. This marker segment can only be attached to the main header. FIG. 5 is an illustrative drawing showing an example of the construction of the CGR marker segment. Lcrg represents the size of the marker segment, Xcrg(i) a horizontal offset position, and Ycrg(i) a vertical offset position.

Figure 6:
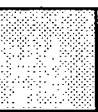
FIG. 6 is an illustrative drawing showing an example of the construction of a COM marker segment.

In the following, the comment marker segment (COM marker) will be described. This marker is used when adding information such as a comment, and can be used in both the main header and the tile header. FIG. 6 is an illustrative drawing showing an example of the construction of the COM marker segment. Lcom represents the size of the marker segment, and Rcom indicates a described value, with Ccom(i) specifying comment data.

As a code range of markers, JPEG2000 defines a range from 0xFF00 to 0xFF3F, as shown in FIG. 7.

Construction of Codec

This embodiment is directed to coding of image data and decoding of coded data that are compressed and encoded, according to the JPEG2000 format.

Figure 8:
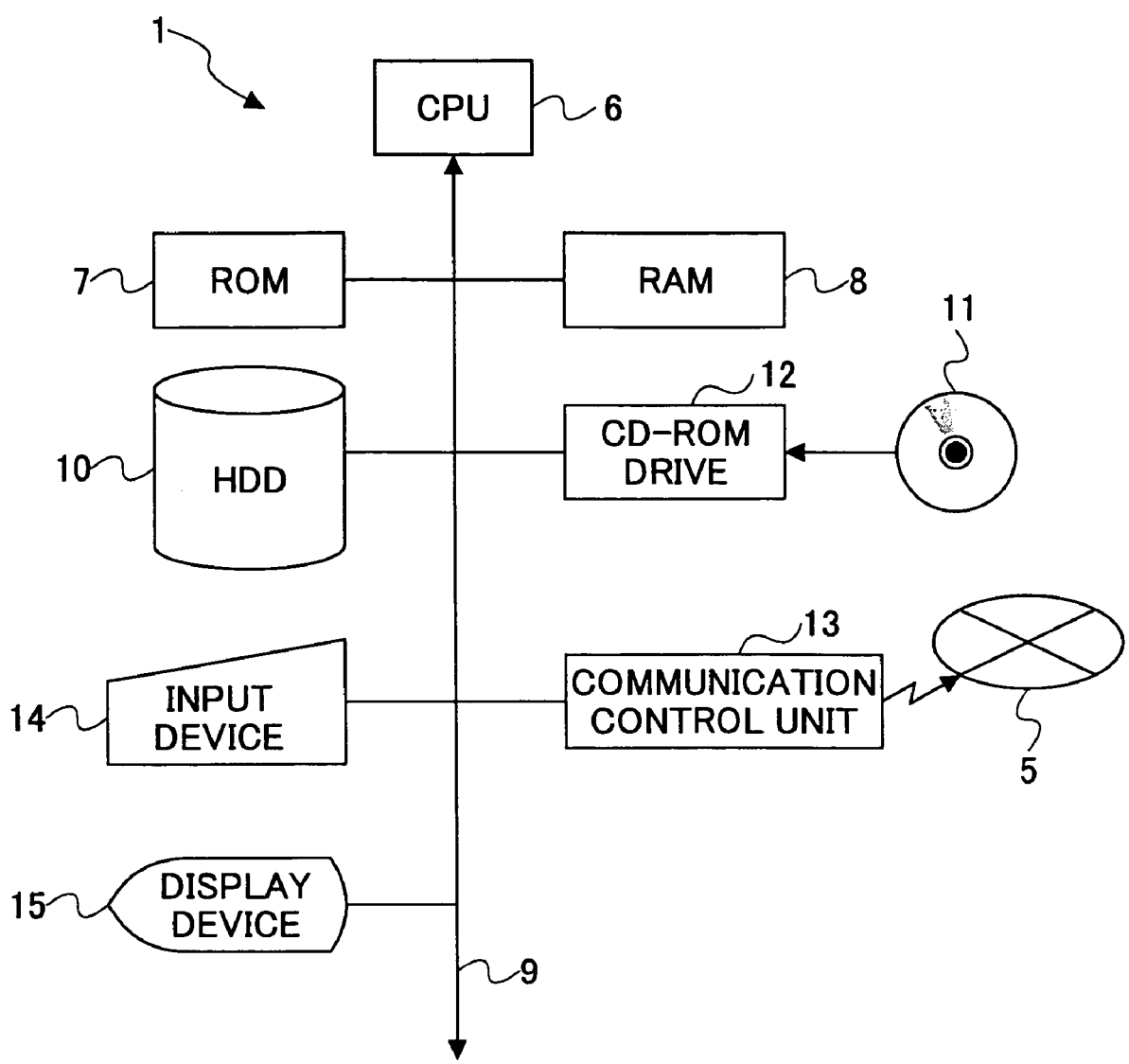
FIG. 8 is a block diagram showing the hardware construction of a personal computer.

A coder/decoder apparatus according to the embodiment may be implemented by use of a personal computer 1 as shown in FIG. 8, for example. FIG. 8 is a block diagram showing the hardware construction of the personal computer 1. As shown in FIG. 8, the personal computer 1 includes a CPU (central processing unit) 6 for processing information, a main storage device such as a ROM (read only memory) 7 and a RAM (random access memory) 8 for storing information, an HDD (hard disk drive) 10 for storing compressed codes that are downloaded from an external source through a network 5 such as the Internet, a CD-ROM drive 12 for storing information and exchanging information with another party, a communication control unit 13 for transmitting information through communication with other computers or the like via the network 5, a display device 15 such as a CRT (cathode ray tube) or an LCD (liquid crystal display) for presenting processing status and results to an operator, and an input device 14 such as a keyboard and mouse for use by the operator to supply instruction and information to the CPU 6. A bus controller 9 arbitrates data that are transmitted and received between these units.

The RAM 8 is able to store various data in a rewritable manner, and is used as a work area for the CPU 6.

In the personal computer 1 as described above, the CPU 6 executes a program called a loader that is stored in the ROM 7 upon power-on by a user. An operating system, which is a program for controlling hardware and software of the computer, is loaded from the HDD 10 to the RAM 8 for execution. The operating system runs programs, reads information, stores information according to user operations. Well-known operating systems include Windows (registered trademark), UNIX (registered trademark), etc. Programs that run on the operating systems are called application programs.

In the coder/decoder apparatus, image-processing programs are stored in the HDD 10 as application software. In this regard, the HDD 10 serves as a memory medium which stores a coding and decoding program.

In general, programs installed in the HDD 10 of the personal computer 1 are provided on an optical information record medium such as a CD-ROM 11 or a DVD-ROM, a magnetic medium such as an FD, etc. These programs are read from the medium to be installed in the HDD 10. In this manner, a portable memory medium, which may be an optical information record medium such as the CD-ROM 11 or a magnetic medium such as an FD, may as well be regarded as a memory medium for storing the image-processing programs. Furthermore, the image-processing programs may be provided from an external source through the communication control unit 13 for installment in the HDD 10.

The image-processing programs described above include a program for compression/decompression according to the JPEG2000 format, which was described with reference to FIG. 1. There is provided a coding function (coding means) to perform compression and encoding according to the JPEG2000 format, which carries out the two-dimensional wavelet transform, quantization, and encoding with respect to image data in this order. Also provided is a decoding function (decoding means) to perform decompression according to the JPEG2000 format, which carries out decoding, dequantization, and the two-dimensional inverse wavelet transform in this order with respect to the compressed and encoded data.

Outline of Decoding and Second-time Encoding

This embodiment is directed to decoding of coded data that is compressed and encoded according to the JPEG2000 format, followed by desired image processing, and then second-time encoding. In the personal computer 1, comment data is provided as additional information in the COM marker. The coded data of interest may be one that has been compressed and coded by the coding function (coding means) of the JPEG2000 format in the personal computer 1, or may be one that has been supplied from an external apparatus such as a scanner or a digital camera, which obtains image data and performs compression and encoding according to the JPEG2000 format. The comment data described in the COM marker can be anything, but may include, for example, the date and time of scanning in the case of scanned image data, the date and time of photographing in the case of digital camera image data, photographing conditions, etc.

Figure 9:
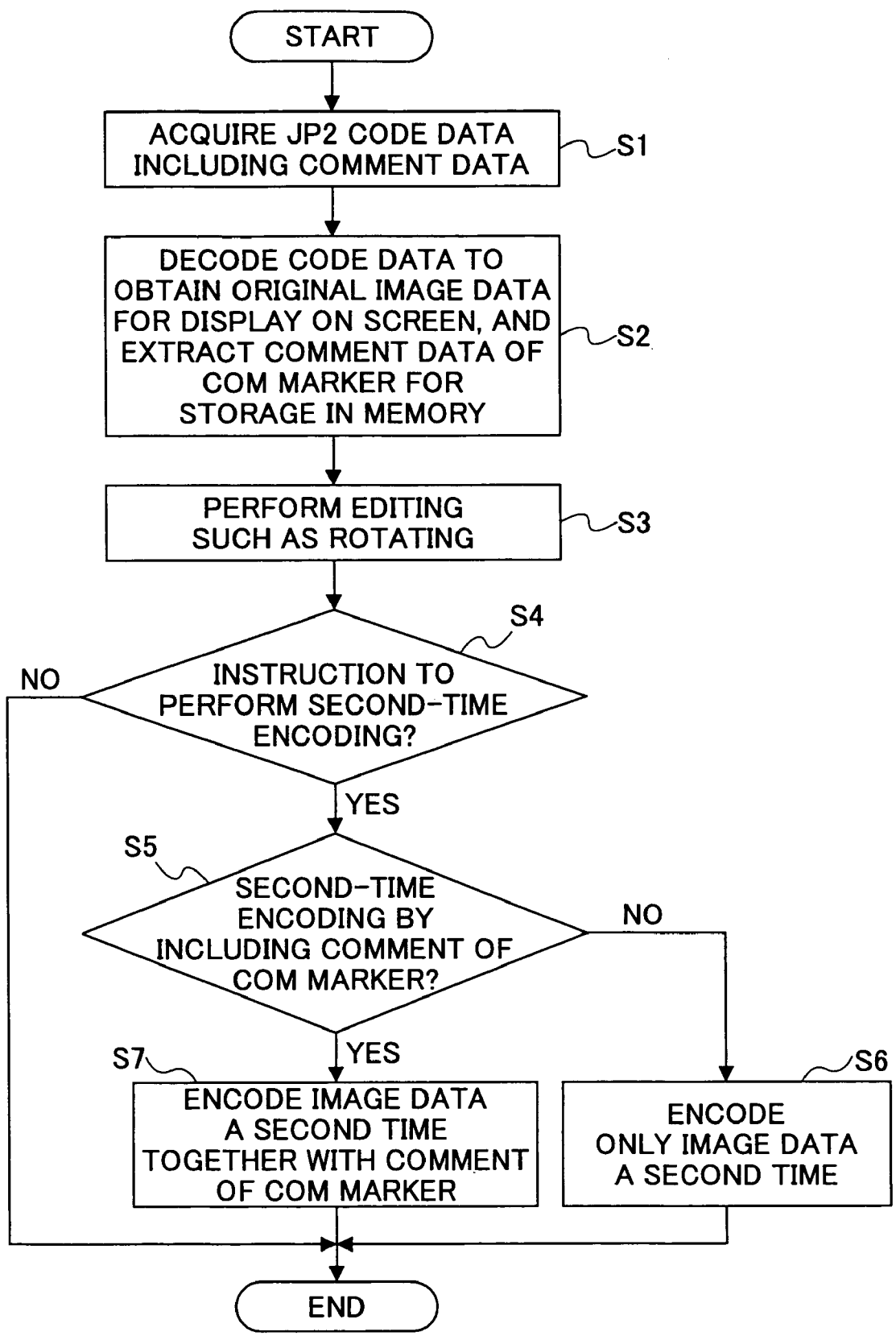
FIG. 9 is a flowchart showing a first example of processing control.

FIG. 9 is a flowchart showing a first example of processing control. Code data that has been compressed and coded according to the JPEG2000 format is loaded to a work area of the RAM 8 (step S1). The decoding means (decoding function) decodes the code data to obtain original image data, which is then presented on the display apparatus 15 (S2). While this is done, comment data (additional information) of the COM marker included in the code data is extracted, and is stored separately from the image data in the RAM 8 (S2). Processing of step S2 corresponds to an additional information extracting means or an additional information extracting function as well as a storing means or a storing function. The image data, which is presented on the display apparatus 15, is subjected to editing such as rotating, flipping upside down, and inverting black and white according to user instruction (S3). Then, a check is made as to whether the user instruction requests second-time encoding of the edited image data (S4). If there is no instruction for second-time encoding (N at S4), the procedure comes to an end. If there is an instruction for second-time encoding (Y at S4), a further check is made as to whether a user instruction requests second-time encoding that includes the comment data in the COM marker stored in the RAM 8 (S5). Processing of step S5 corresponds to a selection means or a selection function. If there is no request for the inclusion of comment data (N at S5), the coding means (coding function) performs second-time encoding with respect to the image data in a conventional manner (S6). Depending on the content of additional information, the content of additional information may change significantly due to the editing that is performed after decoding. There may thus be a case in which the storing of such additional information is not necessary at the time of second-time encoding.

On the other hand, if there is a request for the inclusion of comment data (Y at S5), the coding means (coding function) performs second-time encoding with respect to the image data by including the comment data of the COM marker stored in the RAM 8 as additional information (S7). In this case, all the comment data in the COM marker is added as additional information. Alternatively, provision may be made to select part of the data so as to add the selected data as additional information.

In this manner, the additional information (comment data of the COM marker) included in the code data of JPEG2000 may successfully be included in second-time encoding that is performed after decoding, thereby improving user convenience. It should be noted that lossless encoding is possible in JPEG2000. Since additional information does not require modification at the time of second-time encoding in many cases, a user request that additional information be encoded a second time in a lossless manner can be satisfied.

Figure 10:
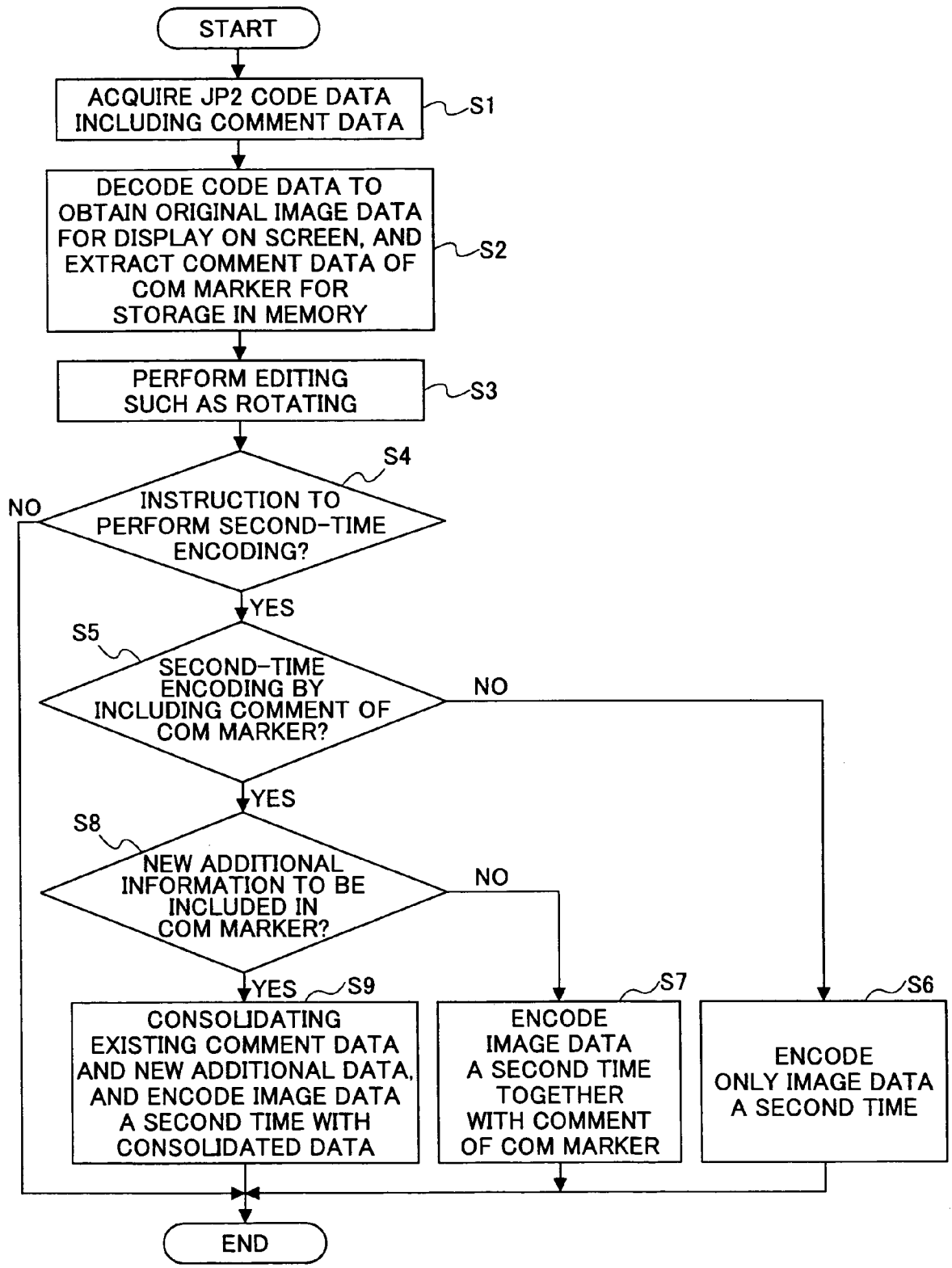
FIG. 10 is a flowchart showing a second example of processing control.

FIG. 10 is a flowchart showing a second example of processing control. The second example is almost identical to the first example. A difference resides in that in response to a request for the inclusion of the comment data (Y at S5), a check is made as to whether new additional information on top of the existing comment data of the COM marker stored in the RAM 8 is to be included in the COM marker, and whether the new additional information is provided (S8). If there is no such a request (N at S8), second-time encoding is performed at step S7 as previously described. If there is a request for the inclusion of new additional information and if such new additional information is provided (Y of S8, an additional information adding means or an additional information adding function), the coding means (coding function) performs second-time encoding with respect to image data by including comment data as additional information where the comment data consolidates the existing additional information stored in the RAM 8 and the new additional information (S9).

According to the second example of processing control, new additional information unique to edited data may be added for second-time encoding if the additional information stored in the RAM 8 is not sufficient. This further improves user convenience.

In the second example of processing control, provision is made to consolidate existing additional information and new additional information for inclusion in the COM marker. This may be done with respect to separate (two or more) COM markers.

Figure 11:
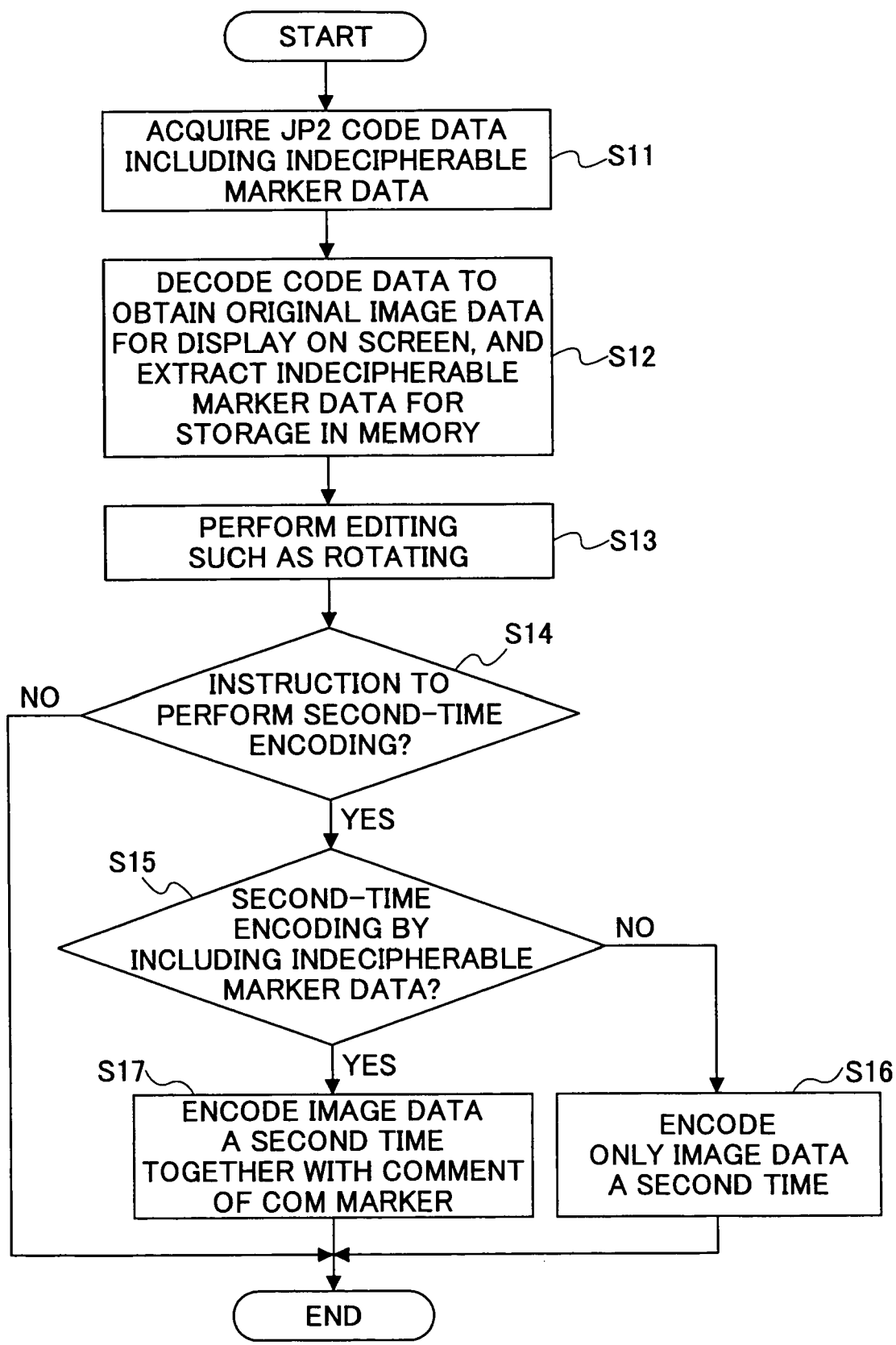
FIG. 11 is a flowchart showing a third example of processing control.

FIG. 11 is a flowchart showing a third example of processing control. This example of processing control is directed to a case in which the JPEG2000 code data includes maker data indecipherable by the decoding means or the decoding function where the marker data is provided as additional information other than comment data of the COM marker. According to the code range of markers of JPEG2000 shown in FIG. 7, a marker may fall between FF4F and FF93, and the decoding means or the decoding function cannot identify such a marker even thought it is known that the marker exists within the marker defined range of the JPEG2000 format. This is because all the values between FF4F and FF93 are not defined in the standard. A manufacturer may use a marker code that is locally defined to be decipherable by the decoding means or the decoding functions of this manufacturer alone.

Code data that has been compressed and coded according to the JPEG2000 format is loaded to a work area of the RAM 8 (step S11) The decoding means (decoding function) decodes the code data to obtain original image data, which is then presented on the display apparatus 15 (S12). While this is done, indecipherable marker data included in the code data is extracted as additional information, and is stored separately from the image data in the RAM 8 (S12). Processing of step S12 corresponds to an additional information extracting means or an additional information extracting function as well as a storing means or a storing function. The image data, which is presented on the display apparatus 15, is subjected to editing such as rotating, flipping upside down, and inverting black and white according to user instruction (S13). Then, a check is made as to whether the user instruction requests second-time encoding of the edited image data (S14). If there is no instruction for second-time encoding (N at S14), the procedure comes to an end. If there is an instruction for second-time encoding (Y at S14), a further check is made as to whether a user instruction requests second-time encoding that includes the indecipherable marker data stored in the RAM 8 (S15). Processing of step S15 corresponds to a selection means or a selection function. If there is no request for the inclusion of the indecipherable marker data (N at S15), the coding means (coding function) performs second-time encoding with respect to the image data in a conventional manner (S16). On the other hand, if there is a request for the inclusion of the indecipherable marker data (Y at S15), the coding means (coding function) performs second-time encoding with respect to the image data by including the indecipherable marker data stored in the RAM 8 as additional information (S17).

In this manner, additional information (indecipherable marker data) included in the code data of JPEG2000 may successfully be included in second-time encoding that is performed after decoding, thereby improving user convenience. Such information may be a local code that is part of tags according to the JPEG2000 format but not defined in the standards, and is thus indecipherable by the decoding means or the decoding function. Such information may be discarded, but there may be a decoding means or a decoding function that can identify the information. Leaving such information intact at the time of second-time encoding as a safeguard may provide for such information to be effectively used later. For example, music data may be contained as markers between FF4F and FF93. A decoder which can identify this data can play the music at the time of decoding and replaying if the data is left intact as additional information. In consideration of such usage, indecipherable marker data may advantageously be left intact at the time of second-time encoding.

Figure 12:
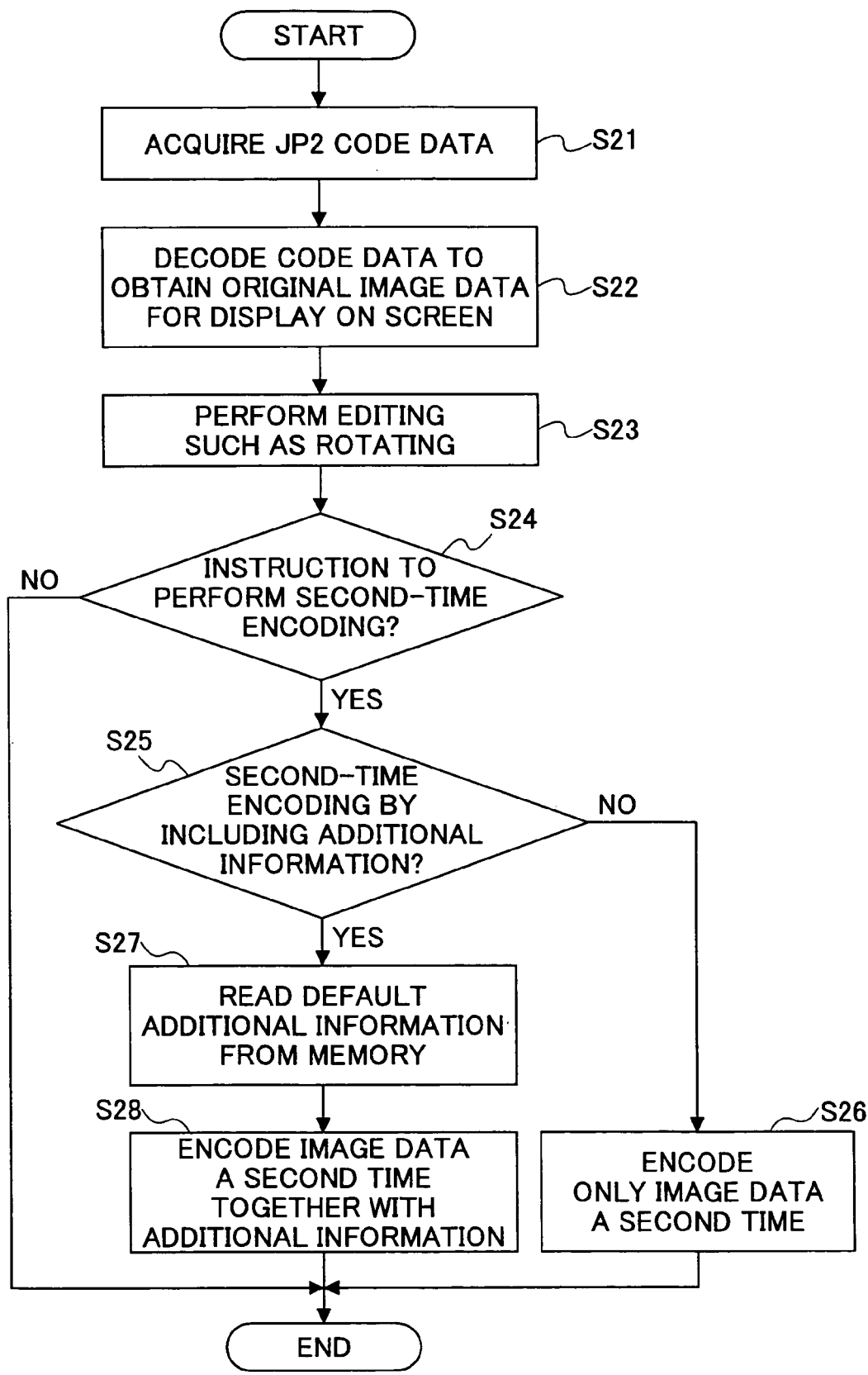
FIG. 12 is a flowchart showing a fourth example of processing control.

FIG. 12 is a flowchart showing a fourth example of processing control. This example of processing control is directed to the use of additional information different from the additional information that is included in the image data. In particular, additional information such as "copyright xx" stored in the RAM 8 as a default setting is used (preserving means or preserving function).

Code data that has been compressed and coded according to the JPEG2000 format is loaded to a work area of the RAM 8 (step S21). The decoding means (decoding function) decodes the code data to obtain original image data, which is then presented on the display apparatus 15 (S22). The image data, which is presented on the display apparatus 15, is subjected to editing such as rotating, flipping upside down, and inverting black and white according to user instruction (S23). Then, a check is made as to whether the user instruction requests second-time encoding of the edited image data (S24). If there is no instruction for second-time encoding (N at S24), the procedure comes to an end. If there is an instruction for second-time encoding (Y at S24), a further check is made as to whether a user instruction requests second-time encoding that includes default additional information stored in the RAM 8 (S25). Processing of step S25 corresponds to a selection means or a selection function. If there is no request for the inclusion of the additional information (N at S25), the coding means (coding function) performs second-time encoding with respect to the image data in a conventional manner (S26). On the other hand, if there is a request for the inclusion of the additional information (Y at S25), the default additional information is read from the RAM 8 (S27), and the coding means (coding function) performs second-time encoding with respect to the image data by including the default additional information as additional information (S28).

According to the fourth example of processing control, additional information of a routine form such as "copyright xx" may be provided as a default setting, and such default additional information is included as the decoded image data is encoded a second time. This simplifies the process required for entering the additional information.

Figure 13:
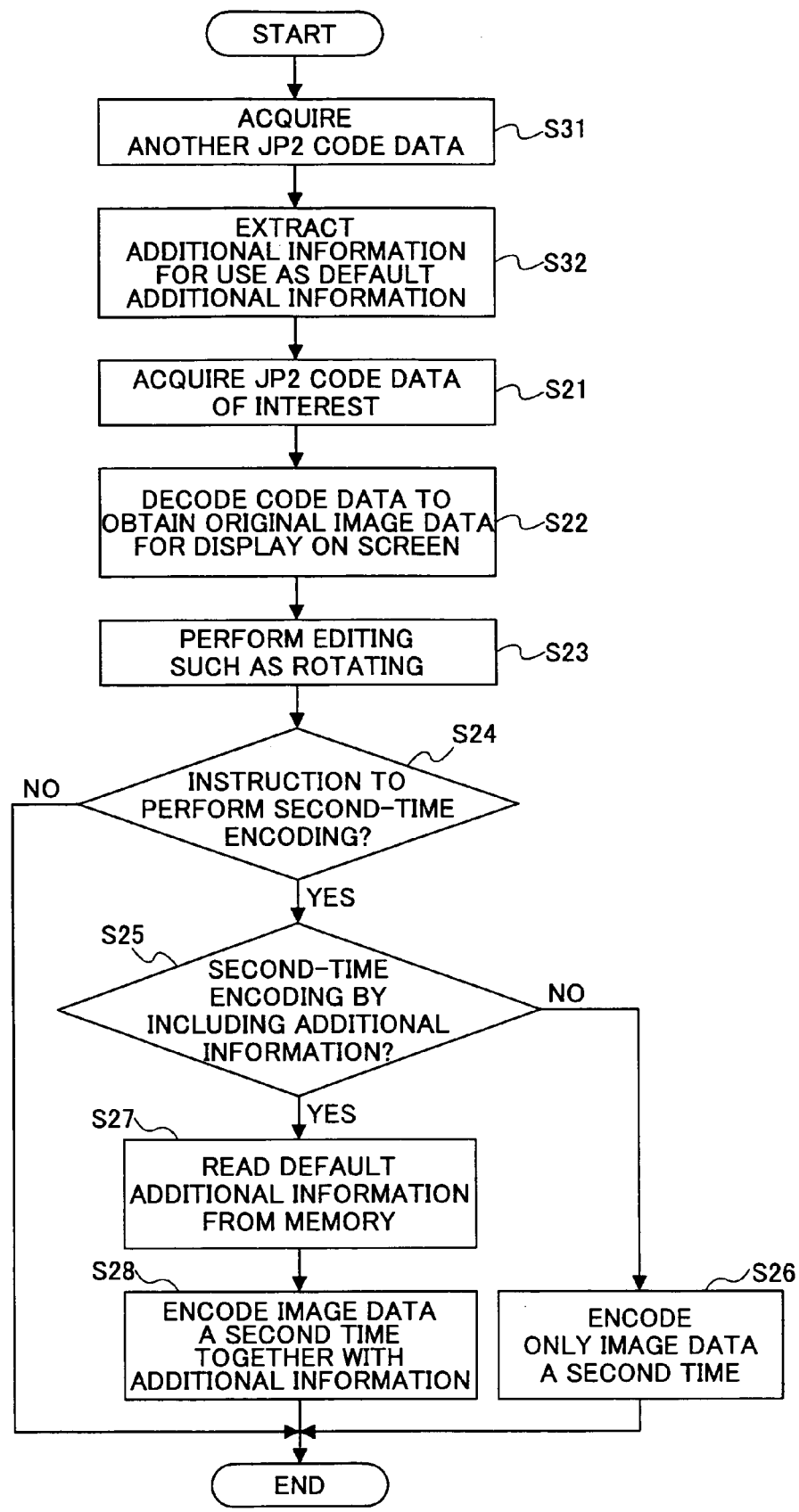
FIG. 13 is a flowchart showing a fifth example of processing control.

FIG. 13 is a flowchart showing a fifth example of processing control. This example of processing control is directed to the use of additional information included in another image data that is different from additional information included in the image data of interest.

Code data that has been compressed and coded according to another JPEG2000 format using additional information is loaded to a work area of the RAM 8 (step S31). Additional information is extracted from the code data, and is stored in the RAM 8 as default additional information (S32). The processing of step S32 corresponds to a preserving means or a preserving function. In the same manner as in the fourth example of processing control, then, code data that has been compressed and coded according to the JPEG2000 format of interest is loaded to a work area of the RAM 8 (step S21). The decoding means (decoding function) decodes the code data to obtain original image data, which is then presented on the display apparatus 15 (S22). The image data, which is presented on the display apparatus 15, is subjected to editing such as rotating, flipping upside down, and inverting black and white according to user instruction (S23). Then, a check is made as to whether the user instruction requests second-time encoding of the edited image data (S24). If there is no instruction for second-time encoding (N at S24), the procedure comes to an end. If there is an instruction for second-time encoding (Y at S24), a further check is made as to whether a user instruction requests second-time encoding that includes the default additional information (i.e., the additional information included in another image data that is different from the additional information included in the image data of interest) stored in the RAM 8 (S25). Processing of step S25 corresponds to a selection means or a selection function. If there is no request for the inclusion of the additional information (N at S25), the coding means (coding function) performs second-time encoding with respect to the image data in a conventional manner (S26). On the other hand, if there is a request for the inclusion of the additional information (Y at S25), the default additional information is read from the RAM 8 (S27), and the coding means (coding function) performs second-time encoding with respect to the image data by including the default additional information as additional information (S28).

According to the fifth example of processing control, additional information extracted from another code data having common additional information may be provided in a storage, and such additional information of another code data is utilized as additional information for the code data of interest as the decoded image data is encoded a second time. This simplifies the process required for entering the additional information.

The additional information that is stored in the RAM 8 and added at the time of second-time encoding with respect to decoded image data may not be limited to comment data in a COM marker, but may be information included in a CRG marker of the JPEG2000 format as described with reference to FIG. 5. The CRG marker specifies a positional displacement with respect to each component, and this positional displacement should be reflected when images are displayed or printed after decoding. Some decoders, however, are not equipped with a proper tool even though they can identify the marker, resulting in these components being overlaid on a display screen without regard to the positional displacement. Nonetheless, there are other decoders that are equipped with a proper tool for processing the information included in the CRG marker. Leaving the information intact at the time of second-time encoding thus has merits.

The above examples have been described with reference to a case in which the JPEG2000 format is used. In an environment where coding and decoding are performed according to the JPEG format, information included in the COM marker of the JPEG format may as well be used as additional information at the time of second-time encoding.

Information is not limited to one included in a code format as described above. It is effective to use information included in a file format (JPEG or JPEG2000) as additional information at the time of second-time encoding.

Figure 14:
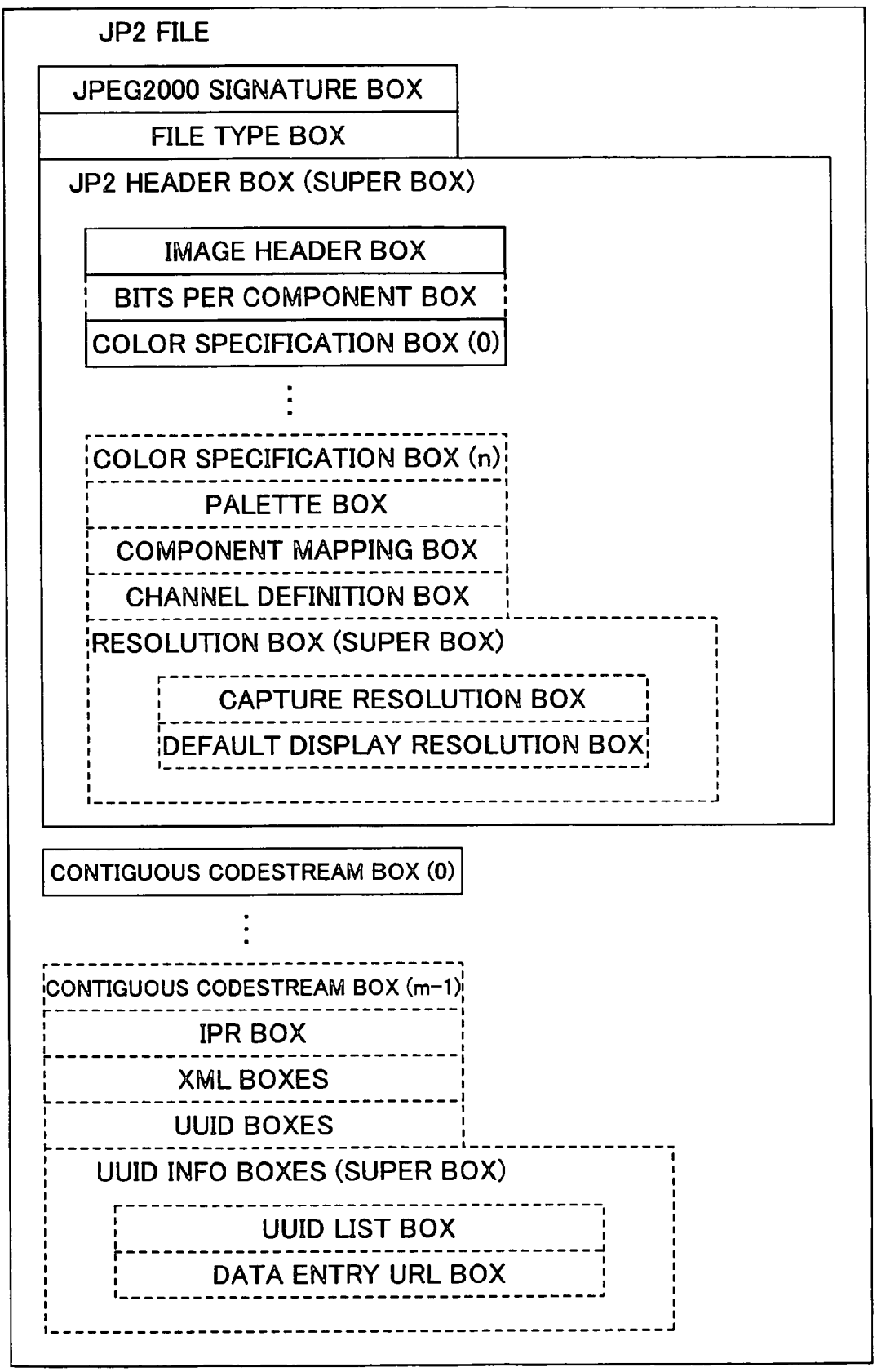
FIG. 14 is an illustrative drawing for explaining the JP2 file format.
Figure 15:
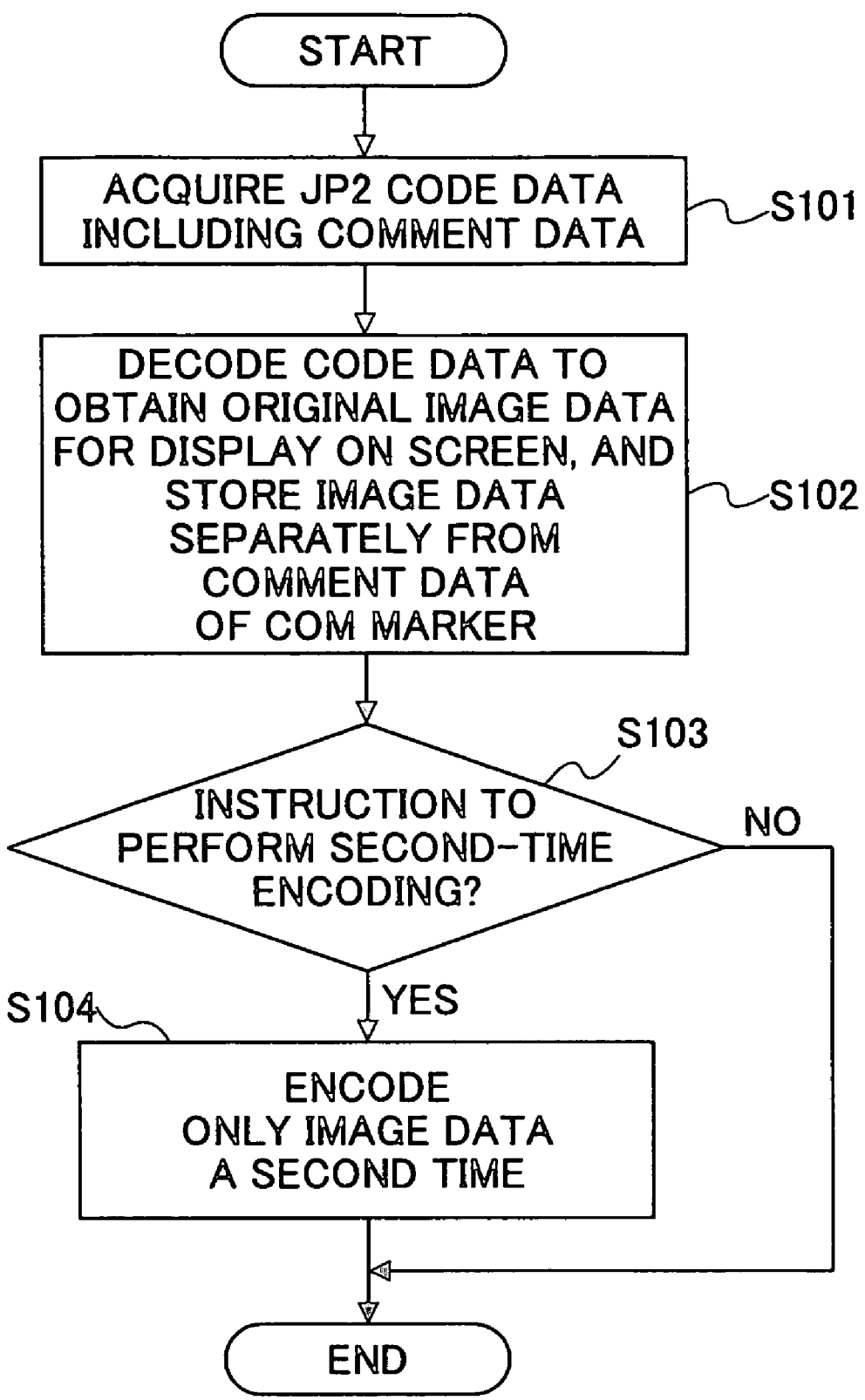
FIG. 15 is a flowchart showing a related-art process of decoding and second-time encoding.

FIG. 14 is an illustrative drawing for explaining the JP2 file format. The JP2 file format includes the JPEG2000 code format, and is aimed at including:
 image data and metadata;
 information indicative of image characteristics such as the number of tone levels, a color space, etc.; and
 information indicative of intellectual property rights.

The structure of a JP2 file is shown in FIG. 14. The JP2 file is comprised of information blocks called a "box", and includes metadata, which is information specific to application. In FIG. 14, information enclosed in a solid-line rectangle is required box information, and information enclosed in a dotted-line rectangle is optional box information.

In this embodiment, information that is included in the JP2 file format and effective as additional information for second-time encoding is information included in IPR box, XML box, UUID box, or UUID info box.

Information included in the IPR (intellectual property) box of the JP2 file format specifies intellectual property rights such as "copyright xx", and is meaningful data that should preferably be left intact even after second-time encoding.

Information included in the XML box is user-defined box information described in the XML format, which is optional and capable of describing information specific to application. This information is one of the additional information items that should preferably be left intact even after second-time encoding.

Information included in the UUID box is user-defined box information, which is optional and capable of describing information specific to application. This information is one of the additional information items that should preferably be left intact even after second-time encoding.

Information included in the UUID info box is user-defined box information about the UUID information. This information has a super box structure (i.e., a structure in which box information is included in box information), and is comprised of a UUID List box representing a user-defined list of UUID information and a Data Entry URL box representing URL information. This information is one of the additional information items that should preferably be left intact even after second-time encoding.

Further, the present invention is not limited to these embodiments, but various variations and modifications may be made without departing from the scope of the present invention.

The present application is based on

Japanese priority application No. 2002-338774 filed on Nov. 22, 2002, with the Japanese Patent Office, the entire contents of which are hereby incorporated by reference.

What is claimed is:

1. An apparatus for coding and decoding, comprising:
 a decoding unit configured to decode compressed and coded data to restore original image data;
 an additional information extracting unit configured to extract additional information from the compressed and coded data when the compressed and coded data is decoded by the decoding unit;
 a display unit configured to display the image data restored by the decoding unit on a screen;
 a storing unit configured to store the image data restored by the decoding unit and the additional information extracted by the additional information extracting unit in memory, the additional information being information included in a comment marker corresponding to said compressed and coded data;
 a coding unit configured to encode the image data and at least a portion of the additional information stored in said memory as information additional to the image data when performing second-time encoding of the image data decoded by said decoding unit to generate second-time-encoded data inclusive of the image data as decoded and then encoded and the portion of the additional information as extracted and then encoded; and
 a selection unit configured to select whether to encode the additional information when said coding unit performs the second-time encoding.

2. The apparatus of claim 1, further comprising:
 an interface configured to receive an input to edit a format of the restored image data displayed on the screen by the display unit.

3. The apparatus of claim 2, wherein the input corresponds to one of a rotating, flipping and color inversion of the restored image displayed on the screen.

4. The apparatus of claim 1, wherein the additional information included in the comment marker indicates one of a time of scanning of the image data and a time of photographing of the image data.

5. A computer-readable record medium having a program embodied therein for causing a computer to perform coding and decoding, said program comprising:
 a decoding unit configured to decode compressed and coded data to restore original image data;
 an additional information extracting unit configured to extract additional information from the compressed and coded data when the compressed and coded data is decoded by the decoding unit;
 a display unit configured to display the image data restored by the decoding unit on a screen;
 a storing unit configured to store the image data restored by the decoding unit and the additional information extracted by the additional information extracting unit in memory, the additional information being information included in a comment marker corresponding to said compressed and coded data;
 a coding unit configured to encode the image data and at least a portion of the additional information stored in said memory as information additional to the image data when performing second-time encoding of the image data decoded by said decoding unit to generate second-time-encoded data inclusive of the image data as decoded and then encoded and the portion of the additional information as extracted and then encoded; and
 a selection unit configured to select whether to encode the additional information when said coding unit performs the second-time encoding.

6. The computer-readable recording medium of claim 5, further comprising:
 an interface unit configured to receive an input to edit a format of the restored image data displayed on the screen by the display unit.

7. The computer-readable recording medium of claim 5, wherein the input corresponds to one of a rotating, flipping and color inversion of the restored image displayed on the screen.

8. The computer-readable recording medium of claim 5, wherein the additional information included in the comment marker indicates one of a time of scanning of the image data and a time of photographing of the image data.

9. An apparatus for coding and decoding, comprising:
   means for decoding compressed and coded data to restore original image data;
   means for extracting additional information from the compressed and coded data when the compressed and coded data is decoded by the means for decoding;
   means for displaying the image data restored by the means for decoding;
   means for storing the image data restored by the means for decoding and the additional information extracted by the means for extracting, the additional information being information included in a comment marker corresponding to said compressed and coded data;
   means for encoding the image data and at least a portion of the additional information stored in said means for storing as information additional to the image data when performing second-time encoding of the image data decoded by said means for decoding to generate second-time-encoded data inclusive of the image data as decoded and then encoded and the portion of the additional information as extracted and then encoded; and
   means for selecting whether to encode the additional information when said means for encoding performs the second-time encoding.

10. The apparatus of claim 9, further comprising:
    means for receiving an input to edit a format of the restored image data displayed by the means for displaying.

11. The apparatus of claim 10, wherein the input corresponds to one of a rotating, flipping and color inversion of the restored image displayed on the screen.

12. The apparatus of claim 9, wherein the additional information included in the comment marker indicates one of a time of scanning of the image data and a time of photographing of the image data.

* * * * *